US008762716B2

(12) United States Patent
Eom et al.

(10) Patent No.: US 8,762,716 B2

(45) Date of Patent: Jun. 24, 2014

(54) IMAGE FORMING APPARATUS

(75) Inventors: Yoon Seop Eom, Suwon-si (KR); Se Hyun Lyu, Seoul (KR); Jung Hwan Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 269 days.

(21) Appl. No.: 12/900,701

(22) Filed: Oct. 8, 2010

(65) Prior Publication Data

US 2011/0093702 A1 Apr. 21, 2011

(30) Foreign Application Priority Data

Oct. 15, 2009 (KR) ........................ 10-2009-0097980

(51) Int. Cl.
*H04L 9/32* (2006.01)

(52) U.S. Cl.
USPC ............... 713/168; 713/186; 713/193; 726/2; 726/4; 726/17; 726/19; 726/21; 358/1.1; 358/1.14; 358/1.15; 370/252; 370/253

(58) Field of Classification Search
USPC ................ 713/168, 193, 186; 399/12–13, 88, 399/227–228; 358/1.1, 1.14, 1.15; 726/19, 726/2, 4, 17, 21; 370/252, 253
See application file for complete search history.

(56) References Cited

U.S. PATENT DOCUMENTS

| | | | | |
|---|---|---|---|---|
| 6,915,094 | B2 * | 7/2005 | Tsuruya et al. | 399/227 |
| 7,058,332 | B2 * | 6/2006 | Moroi | 399/80 |
| 7,613,929 | B2 * | 11/2009 | Cohen et al. | 713/186 |
| 8,336,096 | B2 * | 12/2012 | Narusawa et al. | 726/19 |

* cited by examiner

*Primary Examiner* — Thanhnga B Truong
(74) *Attorney, Agent, or Firm* — Stanzione & Kim, LLP

(57) ABSTRACT

An image forming apparatus includes a main controller unit provided in a main body of the image forming apparatus. The main controller includes a replacement component management memory to store lifespan information of a replacement component is provided in An authentication operation is performed with respect to the replacement component management memory, and the lifespan information of the replacement component is encrypted and stored in the replacement component management memory. Accordingly, the security of the main controller unit may be enhanced and illegal use of the replacement component may be prevented.

8 Claims, 9 Drawing Sheets

IMAGE FORMING APPARATUS

CROSS-REFERENCE TO RELATED APPLICATIONS

This application claims priority under 35 USC §119 from Korean Patent Application No. 2009-0097980, filed on Oct. 15, 2009 in the Korean Intellectual Property Office, the disclosure of which is incorporated herein by reference.

BACKGROUND

1. Field of the Invention

Embodiments of the present general inventive concept relate to an image forming apparatus including a replacement component which is periodically replaced and is detachably mounted in a main body of the image forming apparatus.

2. Description of the Related Art

In an image forming apparatus such as a printer, a scanner, a copier or a multifunction printer, an initial replacement component which is initially used is provided during production, unlike a commercial replacement component.

For example, a development unit which is a replacement component of a color image forming apparatus may be divided into an initial development unit which is initially mounted in an image forming apparatus during manufacture thereof and a commercial development unit which is purchased and used by a user.

In general, the initial development unit may not include a Customer Replaceable Unit Monitoring (CRUM) memory to store information about the amount of toner used, in order to reduce material costs.

If the initial development unit does not include the CRUM memory, a user may purchase a commercial development unit and continuously perform printing, after purchasing an image forming apparatus and performing printing using toner contained in the initial development unit until the contained toner is used up.

Since the initial development unit does not include the CRUM memory to store the number of printed sheets, the image forming apparatus performs a hard stop operation such that printing is not performed using the initial development unit if the number of printed sheets exceeds a predetermined number. The hard stop operation is performed, for example, if a page count, a dot count, a photosensitive drum operation time, or a rotation time of a development roller in the development unit is greater than a predetermined limit value.

In order to perform the hard stop operation, information about the amount of toner used during printing is stored in a main controller unit. In the related art, the information about the amount of the toner used is stored in an Electrically Erasable Programmable Read-Only Memory (EEPROM) which is a non-volatile memory, thereby managing a replacement component. The non-volatile memory is widely used because a data value stored therein in advance is not erased even when the system power of the image forming apparatus is turned off.

However, when the EEPROM of the main controller unit is removed or data is accessed from a Central Processing Unit (CPU), a normal data value may be hacked using a hacking kit so as not to be transmitted.

A page count value, a dot count value and the like are stored in the EEPROM whenever printing is performed. At this time, the hacking kit may disturb "data writing" such that the data is not stored in the EEPROM. Alternatively, in a process of reading a data value stored in the EEPROM in association with the hard stop operation of the initial development unit so as to check whether a hard stop limit value has been reached, the hacking kit may change the data value to a normal value and transmit the changed data value to the CPU such that the CPU may not perform the hard stop operation due to such erroneous information. Thus, the initial development unit may be infinitely refilled.

SUMMARY

Therefore, it is a feature of the present general inventive concept to provide an image forming apparatus which enhances security of a main controller unit having lifespan information of a replacement component stored therein so as to prevent illegal use of the replacement component.

Additional features of the general inventive concept will be set forth in part in the description which follows and, in part, will be obvious from the description, or may be learned by practice of the general inventive concept.

In accordance with one feature of the present general inventive concept, there is provided an image forming apparatus including a replacement component, and a main controller unit including a replacement component management memory having lifespan information of the replacement component stored therein and a Central Processing Unit (CPU) to read information stored in the replacement component management memory and to perform an authentication operation with respect to the replacement component management memory.

The replacement component management memory may store an authentication key, and the CPU may check whether the replacement component management memory is genuine depending on whether the authentication key stored in the replacement component management memory coincides with a predetermined authentication key and perform the authentication with respect to the replacement component management memory.

The replacement component may be a development unit.

The lifespan information of the development unit may include, but is not limited to, at least one of information about the amount of toner in the development unit, information about the amount of the toner consumed from the development unit, information about a driving time of the development unit, and print output page count information.

The replacement component management memory may be integrally formed with the CPU.

The image forming apparatus may further include a flash memory, and the replacement component management memory may be integrally formed with the flash memory.

The replacement component management memory may be detachably connected to the main controller unit by a sub printed circuit board on which the replacement component management memory is mounted.

The CPU may encrypt and store the lifespan information in a Customer Replaceable Unit Monitoring (CRUM) memory after the authentication operation of the replacement component management memory is completed.

In accordance with another feature of the present general inventive concept, there is provided an image forming apparatus including a replacement component, and a main controller unit including a replacement component management memory storing lifespan information of the replacement component and a Central Processing Unit (CPU) to encrypt and store the lifespan information of the replacement component in the replacement component management memory.

The replacement component may include a development unit, and the lifespan information of the development unit may include at least one of information about the amount of toner in the development unit, information about the amount of the toner consumed from the development unit, information about a driving time of the development unit, and print output page count information.

The image forming apparatus may further include a non-volatile memory, the CPU may store the lifespan information of the development unit in the replacement component management memory, and the non-volatile memory may store information other than the lifespan information.

The replacement component management memory may be integrally formed with any one of the CPU or a flash memory.

In accordance with another feature of the present general inventive concept, there is provided an image forming apparatus including a main controller unit including a Central Processing Unit (CPU) and a replacement component management memory, and a detachable development unit including a Customer Replaceable Unit Monitoring (CRUM) memory, wherein the CPU performs an authentication operation with respect to the replacement component management memory, encrypts and stores lifespan information of the development unit in the replacement component management memory, and updates the lifespan information of the development unit stored in the CRUM memory using the lifespan information of the development unit stored in the replacement component management memory.

The CPU may update the lifespan information stored in the CRUM memory using the lifespan information stored in the replacement component management memory after a development operation, after a transfer operation, after the transfer operation and before a fixing operation, before the fixing operation is completed, or after the fixing operation is completed.

According to the embodiments of the present general inventive concept, a replacement component management memory to store lifespan information of a replacement component is provided in a main controller unit provided in a main body of the image forming apparatus. An authentication operation is performed with respect to the replacement component management memory, and the lifespan information of the replacement component is encrypted and stored in the replacement component management memory. Accordingly, the security of the replacement component management memory may be enhanced and the illegal use of the replacement component may be prevented.

In yet another feature, an image forming apparatus comprises a development unit including a plurality of replacement components, and a control module in communication with the development unit to control the plurality of replacement components and that authenticates a replacement component management memory and that controls the plurality of replacement components based on the authentication of the replacement component management memory and lifespan information corresponding to at least one replacement component among the plurality of replacement components.

In still another feature, a method of controlling an image forming apparatus including a development unit having a plurality of replacement components comprises comparing authentication information stored in replacement component management memory and corresponding thereto with predetermined authentication information, determining the replacement component management memory is authentic when the authentication information matches the predetermined authentication information and determining the replacement component management memory is unauthentic when the authentication information does not match the predetermined authentication information, operating the plurality of replacement components in response to determining the replacement component management memory is authentic, and preventing operation of at least one replacement component among the plurality of replacement components in response to determining the replacement component management memory is unauthentic.

BRIEF DESCRIPTION OF THE DRAWINGS

These and/or other features of the general inventive concept will become apparent and more readily appreciated from the following description of the embodiments, taken in conjunction with the accompanying drawings of which.

DETAILED DESCRIPTION OF THE EMBODIMENTS

Figure 1:
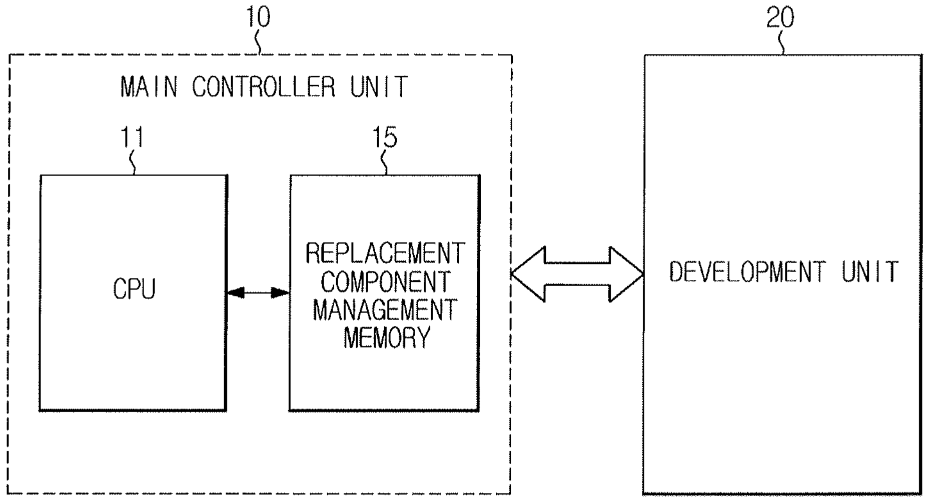
FIG. 1 is a schematic control block diagram of an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. general inventive concept.

Figure 2:
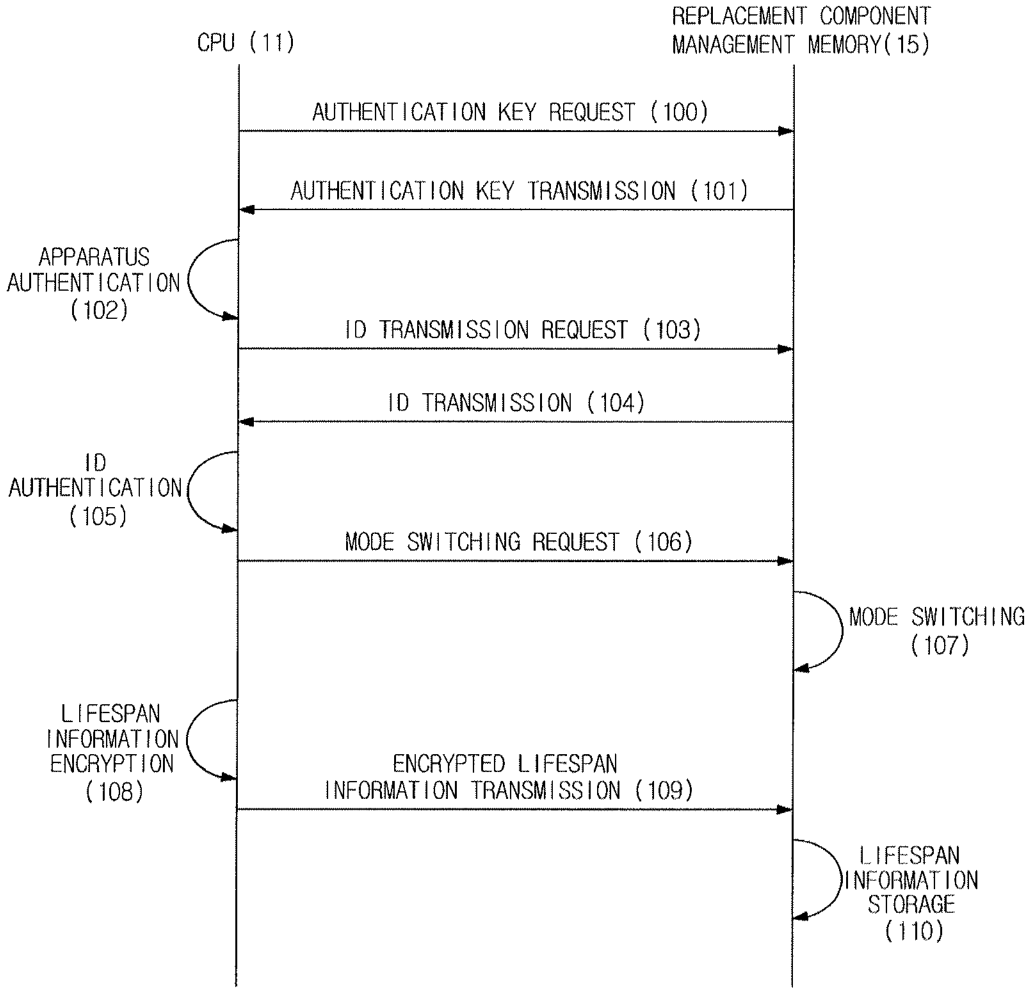
FIG. 2 is a control flowchart illustrating signal flow between a Central Processing Unit (CPU) and a replacement component management memory in a main controller unit of the image forming apparatus shown in FIG. 1.

FIG. 1 is a schematic control block diagram of an image forming apparatus according to an embodiment of the present general inventive concept, and FIG. 2 is a control flowchart illustrating signal flow between a Central Processing Unit (CPU) and a replacement component management memory in a main controller unit of the image forming apparatus shown in FIG. 1.

As shown in FIG. 1, the image forming apparatus according to the embodiment of the present general inventive concept includes a main controller unit 10 and a development unit 20.

The main controller unit 10 may be fixedly mounted in a main body of the image forming apparatus.

The development unit 20 may be detachably mounted in the main body of the image forming apparatus as a replacement component. The replacement component may be detachably mounted in the image forming apparatus and may include, but is not limited to, a charging unit, a transfer unit, a fixing unit, a photosensitive drum, and a feed roller. The replacement component may include all components which need to be replaced in the course of ownership of the image forming apparatus, and may be variously implemented. Hereinafter, for convenience of description, an exemplary case where the replacement component is the development unit 20 will be described.

The main controller unit 10 includes a CPU 11 to perform overall control and a replacement component management memory 15.

The replacement component management memory 15 of the main controller unit 10 includes one or more Customer Replaceable Unit Monitoring (CRUM) memories. Data or commands stored in the replacement component management memory 15 may be encrypted such that the encrypted information, such as a memory control operation, is not compromised and/or is not easily recognized using a hacking kit, or any other means of accessing the replacement component management memory 15 without authorization. Since the CRUM memory is manufactured by a manufacturer of the image forming apparatus, a protocol between the CPU 11 and the CRUM memory is not opened unlike Electrically Erasable Programmable Read-Only Memory (EEPROM), which is a widely used non-volatile memory. That is, EEPROM is user-modifiable read-only memory (ROM) that can be erased and reprogrammed, thereby making it susceptible to unauthorized control. However, the CRUM memory may be manufactured to prevent being reprogrammed.

Accordingly, even when an unauthorized user, i.e., a hacker, mounts a hacking kit in the main controller unit 10, a microcomputer of the hacking kit may not check when data is transmitted and received between the CPU 11 and the replacement component management memory 15. Therefore, the data may be prevented from being intercepted and may not be illegally used.

Referring to FIG. 2, in the control sequence of the CPU 11, authentication operations such as an apparatus authentication and ID authentication operation are performed with respect to the replacement component management memory 15, and the lifespan information of the development unit 20 is encrypted and stored in the replacement component management memory 15 in response to determining that the replacement component management memory 15 is genuine, i.e., corresponds to the manufactured main controller unit. In addition, in the control sequence of the CPU 11, since a user may open a cover of the image forming apparatus and replace the development unit with a new development unit, the authentication operation of the replacement component management memory 15 may be performed when the cover is opened or closed, or when the image forming apparatus is powered on or off.

In addition, the control sequence of the CPU 11 may perform the ID authentication operation after performing the apparatus authentication operation.

First, the CPU 11 of the main controller unit 10 performs the authentication operations such as the apparatus authentication operation and the ID authentication operation of the replacement component management memory 15. That is, the CPU 11 requests transmission of an authentication key to the replacement component management memory 15 (100).

The replacement component management memory 15 receives the request to transmit the authentication key from the CPU 11, and transmits the unique authentication key stored therein to the CPU 11 in response to the authentication key request (101). The authentication key may be pre-stored in the replacement component management memory 15 and corresponds to a key authentication value that may be applied to the replacement component management memory 15 when producing the main controller unit 10, i.e., when the image forming apparatus was originally manufactured. The authentication value of each replacement component management memory 15 may be differently applied according to model names, manufacture dates etc. of image forming apparatuses.

Even when a hacker purchases the replacement component management memory 15, the same authentication key value is not applied to the replacement component management memory 15. Therefore, even when the purchased replacement component management memory 15 is mounted in the main controller unit 10, the apparatus authentication operation is not performed with respect to the replacement component management memory 15. Accordingly, since a next operation is not performed, illegal use of the replacement component management memory may be prevented.

The CPU 11 receives the authentication key from the replacement component management memory 15, compares the received authentication key with a pre-stored authentication key, and performs the apparatus authentication operation with respect to the replacement component management memory 15 (102).

If the apparatus authentication operation of the replacement component management memory 15 is normally performed, i.e., the replacement component management memory 15 is confirmed to be genuine, the CPU 11 requests transmission of ID information to the replacement component management memory 15 (103).

The replacement component management memory 15 receives the request to transmit the ID information from the CPU 11, and transmits the ID information stored therein to the CPU 11 in response to the ID information request (104). At this time, the ID information includes, but is not limited to, a manufacturer name, a product name, a model name, a manufacture date of an image forming apparatus, and a serial number of a replacement component management memory, all of which may be stored in the replacement component management memory 15.

The CPU 11 receives the ID information from the replacement component management memory 15, compares the received ID information with pre-stored ID information, and performs the ID authentication operation with respect to the replacement component management memory 15 (105).

If it is determined that the replacement component management memory 15 is genuine based on the apparatus authentication operation and the ID authentication operation, the CPU 11 makes a request to switch the replacement component management memory 15 from a current mode, i.e., authentication mode, to a normal mode (106).

Accordingly, the replacement component management memory 15 switches from the current mode to the normal mode according to the CPU's request (107).

If it is determined that the replacement component management memory 15 is not genuine, the CPU 11 switches the replacement component management memory 15 from the current mode to an authentication failure mode.

Then, the CPU 11 encrypts the lifespan information of the development unit 20 according to the use of the development unit 20 (108) and transmits the encrypted lifespan information to the replacement component management memory 15 by data communication with the replacement component management memory 15 (109), and the replacement component management memory 15 stores the encrypted lifespan information (110). At this time, the encrypted lifespan information of the development unit 20 includes, but is not limited to, information about the amount of the toner in the development unit 20, information about the amount of toner consumed from the development unit 20, information about actual driving time of the development unit 20 in a printing state, and actual output page count information using the development unit 20.

The operation to encrypt and store the lifespan information of the development unit 20 in the replacement component management memory 15 may be performed in response to the occurrence of at least one of the following conditions: after the toner is developed on a photosensitive drum, after the developed toner image is transferred onto a transfer belt, after the image is transferred onto a sheet and before the image is fixed, before the fixing operation is completed, and after the fixing operation is completed and the sheet is ejected. Additionally, the operation to encrypt and store the lifespan information of the development unit 20 in the replacement component management memory 15 may be performed when 50% or 70% of the printing operation is performed and/or when a post-processing operation is performed after the printing operation is completed.

The lifespan information of the development unit 20 is stored in the replacement component management memory 15 using encrypted data communication. The encrypted data communication may be performed by encrypting the lifespan information together with data to be transmitted using a predetermined encryption algorithm and key and transmitting the encrypted lifespan information. Since the data to be transmitted is frequently changed, the hacker may be prevented from successfully hacking the data during the data communication process. Accordingly, data communication security may be enhanced.

In the case where the authentication operation of the replacement component management memory 15 fails, the image forming apparatus is continuously operated when a lifespan of the initial development unit is in a limit range. The lifespan of the initial development unit, i.e., lifespan information, may include, but is not limited to, information about the amount of toner in the development unit, information about the amount of the toner consumed from the development unit, information about a driving time of the development unit and print output page count information. However, when the lifespan of the initial development unit exceeds a count value of the initial development unit, an operation to output a message suggesting that the user purchase and use a genuine toner cartridge is performed, and the CPU prevent operation of one more replacement components, or may disconnect one more signal transmission lines such that the developing unit is not operable.

If the authentication operation fails several times in the authentication process, the system is stopped and the user is informed that the replacement component management memory 15 is not genuine.

Hacking may be performed using a non-genuine memory. Accordingly, if authentication is requested several times, hacking is prevented from being continuously attempted by storing the ID of the apparatus in the non-volatile memory of the main controller unit 10.

Since a CRUM memory semiconductor is custom-manufactured, the replacement component management memory 15 of the main controller unit 10 may be designed with a size less than that of a commercial non-volatile memory.

Figure 3:
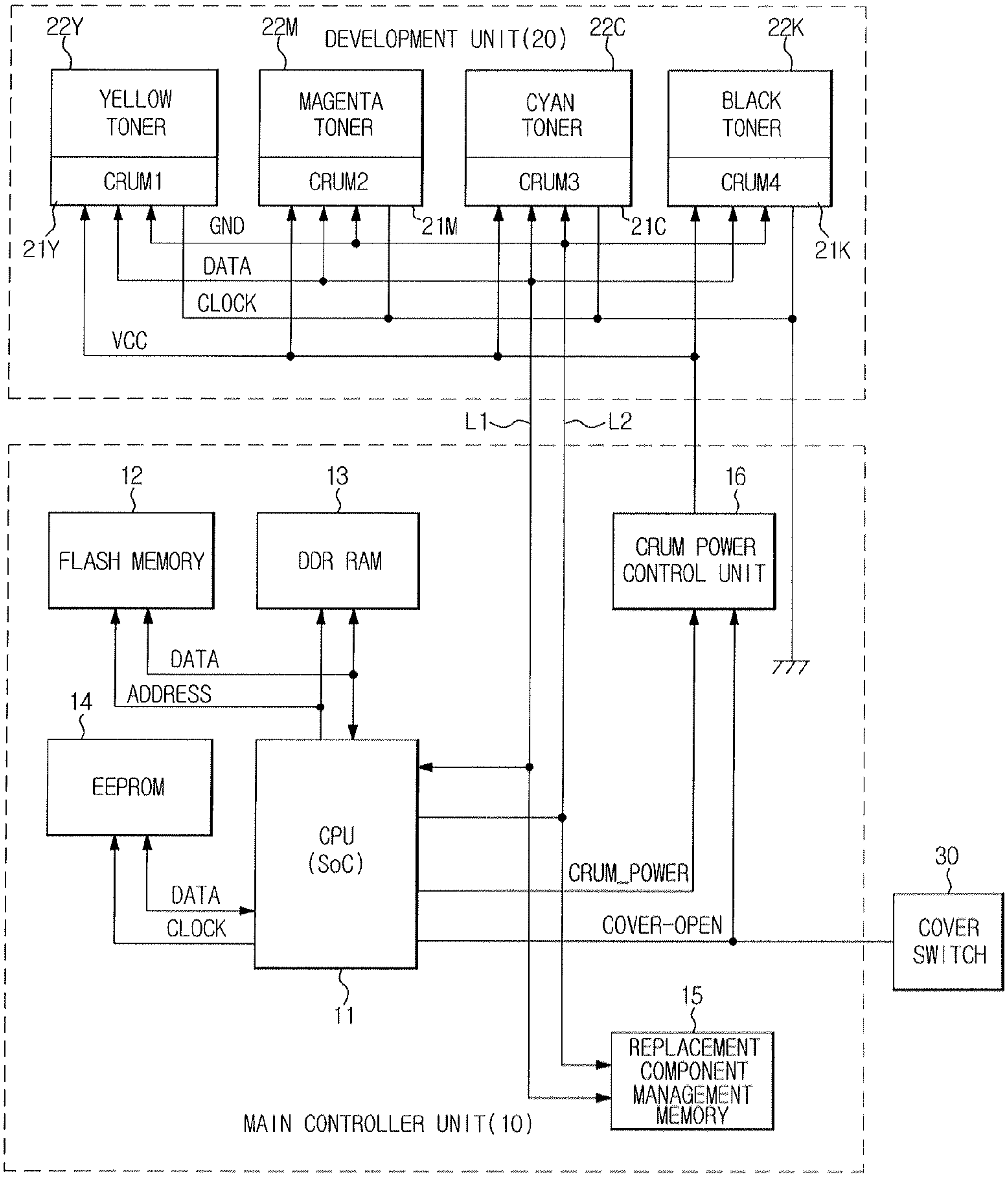
FIG. 3 is a system configuration diagram illustrating a first example of a main controller unit and a development unit in the image forming apparatus according to the embodiment of the present general inventive concept.

If the size of the memory is small, important values of the replaceable cartridge, that is, a print page value associated with an initial cartridge lifespan and an apparatus authentication key value, may be stored in the replacement component management memory 15, and residual general event log values may be stored in a commercially available EEPROM (see reference numeral 14 of FIG. 3).

Since the CRUM memory is not included in the initial development unit, a method of checking whether the development unit 20 is mounted in the system is performed by applying an AC development high voltage to a development roller of the development unit 20, dividing the voltage at a development high voltage output end, sensing a voltage applied to a load, and determining that the initial development unit without the CRUM memory is mounted if the voltage applied to the load is greater than a predetermined level.

FIG. 3 is a system configuration diagram showing a first example of the main controller unit 10 and the development unit 20 in the image forming apparatus according to the embodiment of the present general inventive concept.

As shown in FIG. 3, the image forming apparatus according to the embodiment of the present general inventive concept includes the main controller unit 10 and the development unit 20.

The main controller unit 10 includes a CPU 11, a flash memory 12, a Double Data Rate Random Access Memory (DDR RAM) 13, an EEPROM 14, and a replacement component management memory 15. The main controller unit 10 further includes a CRUM memory power control unit 16 to control the power of CRUM memories 21Y, 21M, 21C and 21K.

A cover switch 30 may be connected to the CPU 11 of the main controller unit 10. The cover switch may be a micro-switch that is switched to an on position or an off position during the opening or closing of the cover of the image forming apparatus. For example, the micro-switch may be interlocked with a portion of the image forming apparatus when the cover of the image forming apparatus is opened or closed.

The main controller unit 10 and the replaceable development unit 20 of the image forming apparatus are configured to be connected by signal transmission lines L1 and L2 to interface with the CRUM memories 21Y, 21M, 21C and 21K.

The CPU 11 of the main controller unit 10 may be formed as a System On Chip (SoC). The CPU 11 shown in FIG. 3 includes multi port channels to communicate between the CRUM memories 21Y, 21M, 21C and 21K of the YMCK toner cartridges 22Y, 22M, 22C and 22K of the development unit 20, and the replacement component management memory 15 of the main controller unit 10.

The four CRUM memories 21Y, 21M, 21C and 21K of the YMCK toner cartridges 22Y, 22M, 22C and 22K, which are the replacement components, and the replacement component management memory 15 mounted in the main controller unit 10 are connected by CRUM channels using signal transmission lines L1 and L2. The replacement component management memory 15 and the CRUM memories 21Y, 21M, 21C and 21K generally communicate with one another using a communication protocol, such as for example, an I2C communication protocol. Since the same physical channel is used, in view of software control, a determination as to whether the replacement component management memory 15 is mounted in the main controller unit 10 may be performed without changing the channel.

Since the signal of the replacement component management memory 15 is connected to an external replacement component, noise may occur due to external Electrical Over Stress (EOS).

The replacement component management memory 15 and the CRUM memories 21Y, 21M, 21C and 21K of the development unit 20 communicate with the CPU 11 using the encrypted data, and communicate with the EEPROM 14 using the general 12C communication protocol.

The replacement component management memory 15 may store only important data values, such as replacement component lifespan information. General information may be stored in the EEPROM 14.

At this time, the replacement component management memory 15 may be chip-mounted on a printed circuit board of the main controller unit 10. The replacement component management memory 15 may be mounted on a sub-printed circuit board, and then may be connected to a printed circuit board.

Figure 4:
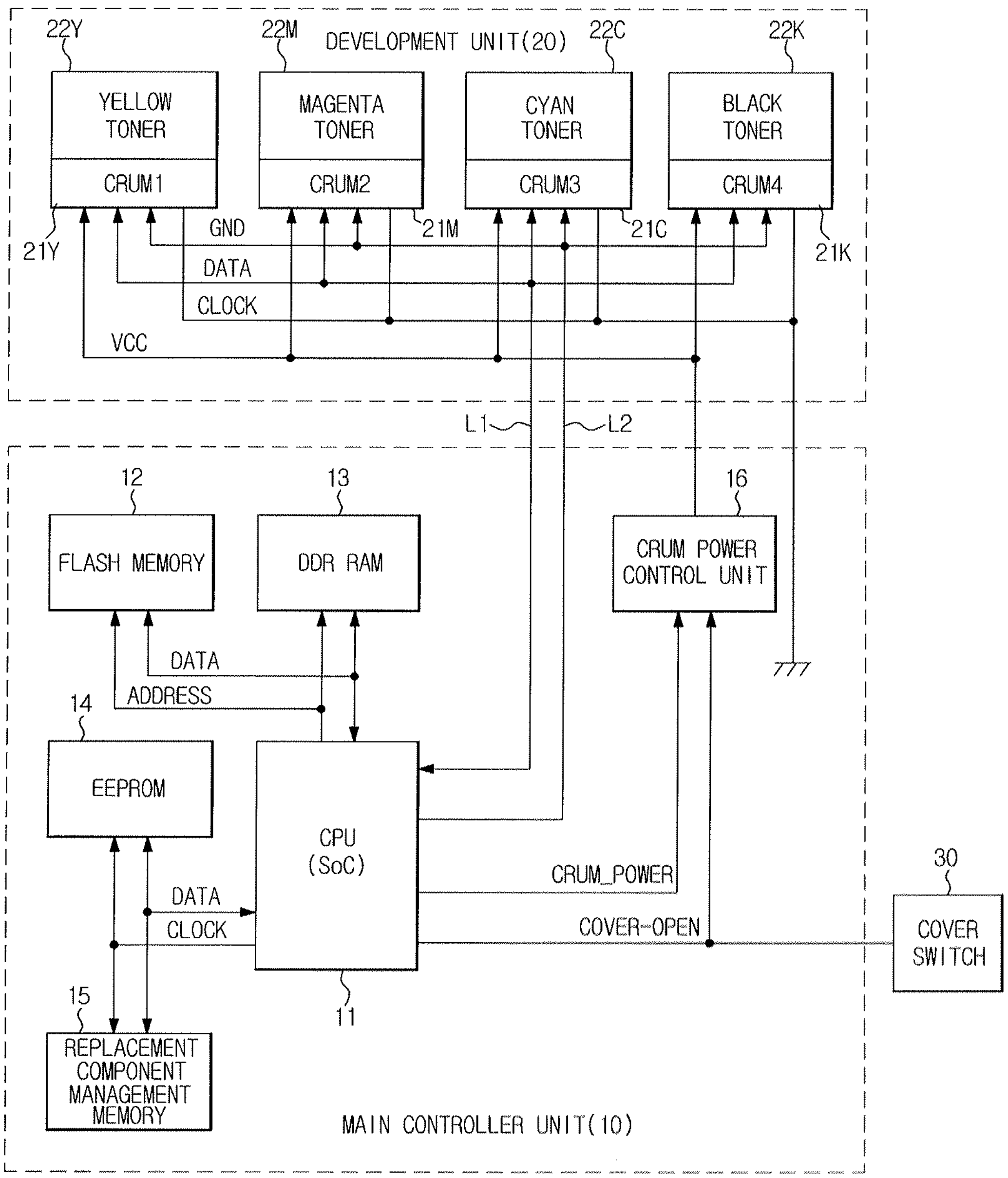
FIG. 4 is a system configuration diagram illustrating a second example of a main controller unit and a development unit in the image forming apparatus according to the embodiment of the present general inventive concept.

FIG. 4 is a system configuration diagram showing a second example of the main controller unit 10 and the development unit 20 in the image forming apparatus according to the embodiment of the present general inventive concept.

As shown in FIG. 4, several port channels to communicate with the CRUM memories 21Y, 21M, 21C and 21K of the YMCK toner cartridges 22Y, 22M, 22C and 22K of the development unit 20 may be included in the CPU 11 of the main controller unit 10.

The CRUM channel of the four CRUM memories 21Y, 21M, 21C and 21K of the development unit 20 uses a "first channel," and the replacement component management memory 15 and the EEPROM 14 mounted in the main controller unit 10 use a "second channel".

In FIG. 4, since the channel signal L2 of the replacement component management memory 15 is not connected to an external component unlike FIG. 3, the example shown in FIG. 4 may not be affected by external EOS. In contrast, if the communication protocols of the replacement component management memory 15 and the commercial EEPROM 14 are different, control is performed to prevent an error when data is written or read to or from the replacement component management memory 15, or when data is written or read to or from the commercially available EEPROM 14.

Figure 5:
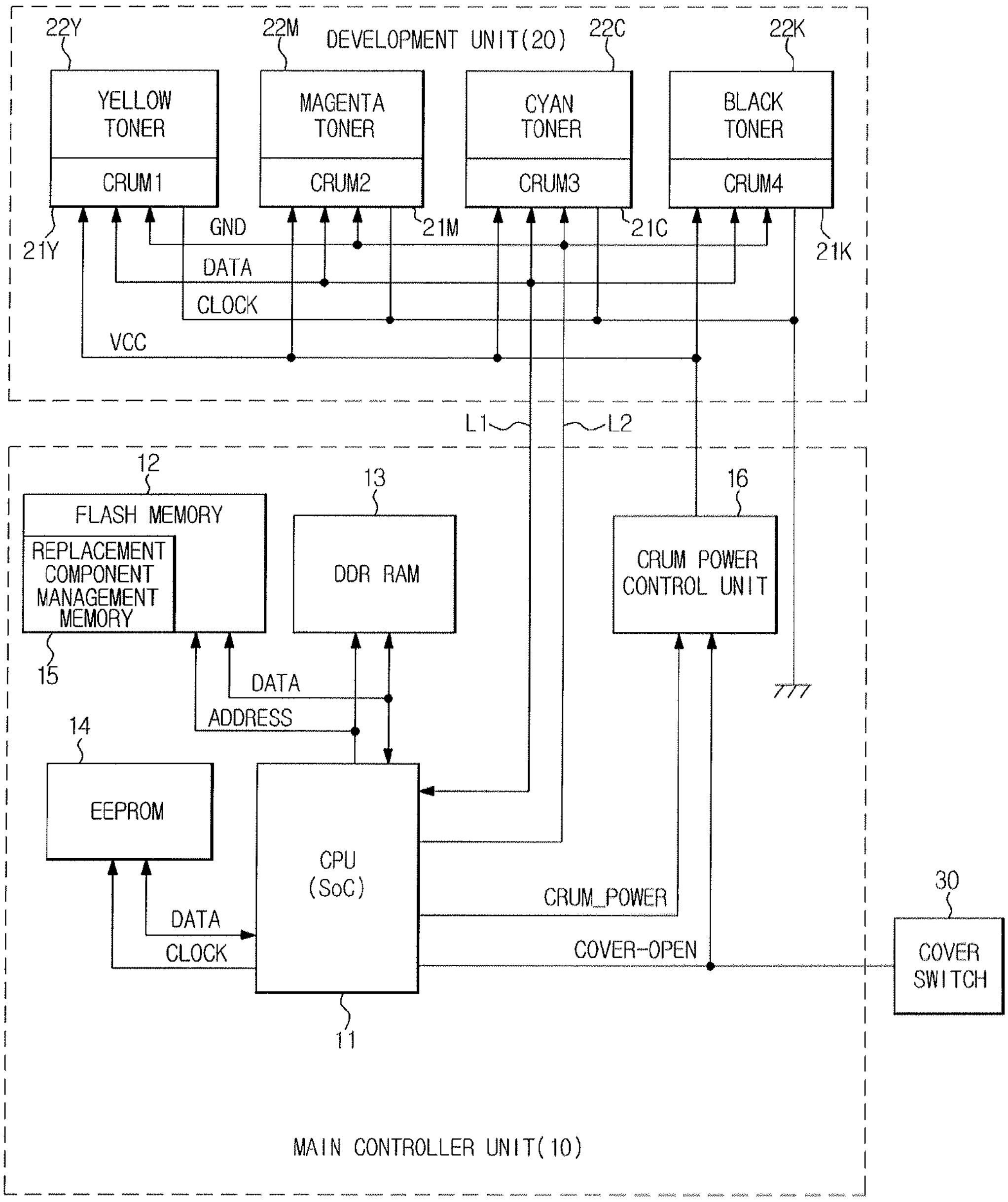
FIG. 5 is a system configuration diagram illustrating a third example of a main controller unit and a development unit in the image forming apparatus according to the embodiment of the present general inventive concept.

FIG. 5 is a system configuration diagram showing a third example of the main controller unit 10 and the development unit 20 in the image forming apparatus according to the embodiment of the present general inventive concept.

As shown in FIG. 5, the replacement component management memory 15 may be mounted in a flash memory, which is a non-volatile memory of the main controller unit 10, such that the flash memory 12 and the replacement component management memory 15 are integrally configured.

The CRUM channel of the four CRUM memories 21Y, 21M, 21C and 21K of the development unit 20 which is the replacement component uses a "first channel" and the replacement component management memory 15 and the EEPROM 14 mounted in the main controller unit 10 use the same CRUM channel, that is, a "second channel." Data of the replacement component management memory 15 is stored in the flash memory 12 and may be electrically erased and rewritten.

Since the replacement component management memory 15 is not separately used as shown in FIGS. 3 and 4, the example shown in FIG. 5 increases cost efficiency of the overall main controller unit 10. In contrast, since the flash memory 12 is used when data is stored in the replacement component management memory 15, data is read or written in the unit of blocks and thus data reading and/or writing time is relatively increased. In the case of the flash memory 12 having 40 to 60 pins, a component replacement operation is not facilitated and thus security is relatively enhanced.

Figure 6:
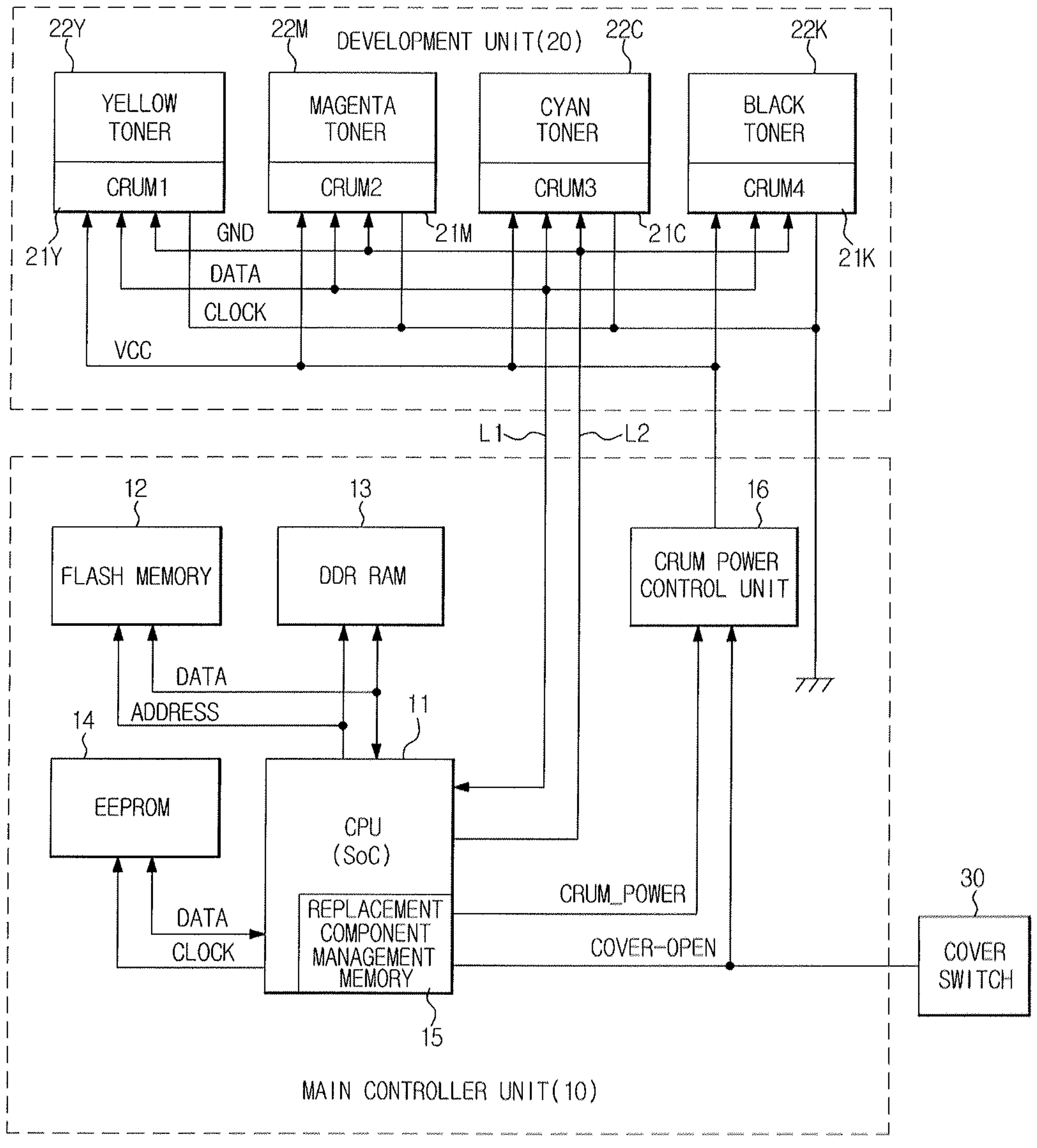
FIG. 6 is a system configuration diagram illustrating a fourth example of a main controller unit and a development unit in the image forming apparatus according to the embodiment of the present general inventive concept.

FIG. 6 is a system configuration diagram showing a fourth example of the main controller unit 10 and the development unit 20 in the image forming apparatus according to the embodiment of the present general inventive concept.

As shown in FIG. 6, the replacement component management memory 15 may be included in the CPU 11 of the main controller unit 10 such that the CPU 11 and the replacement component management memory 15 are integrally configured.

In general, since the CPU 11 is a chip having several hundred pins, it is difficult for even a general user or expert to reprocess and reattach a chip. Accordingly, the security of the replacement component management memory 15 may be enhanced.

Hereinafter, the update of the lifespan information of the CRUM memories 21Y, 21M, 21C and 21K of the development unit 20 using the lifespan information of the development unit 20 stored in the replacement component management memory 15 of the main controller unit 10 will be described.

Figure 7:
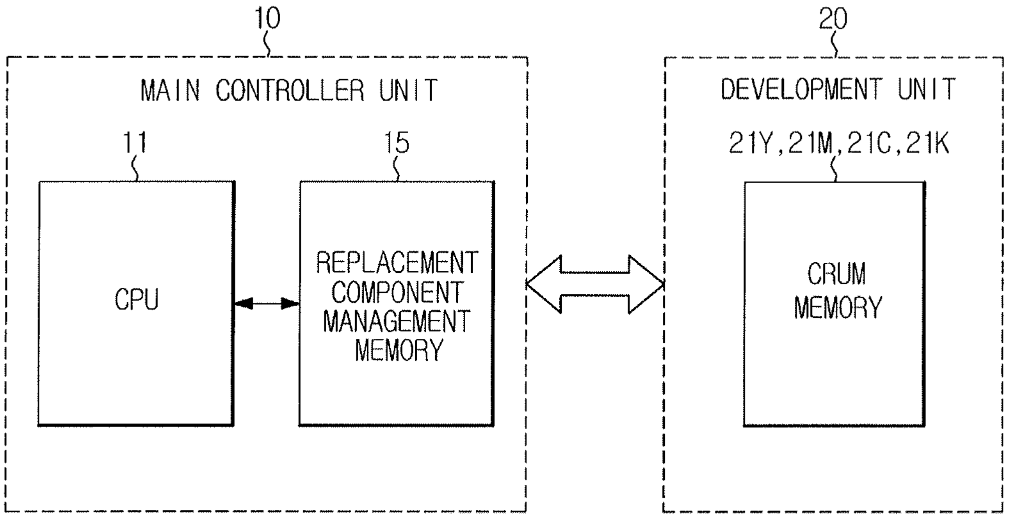
FIG. 7 is a schematic control block diagram of an image forming apparatus according to another embodiment of the present general inventive concept.
Figure 8:
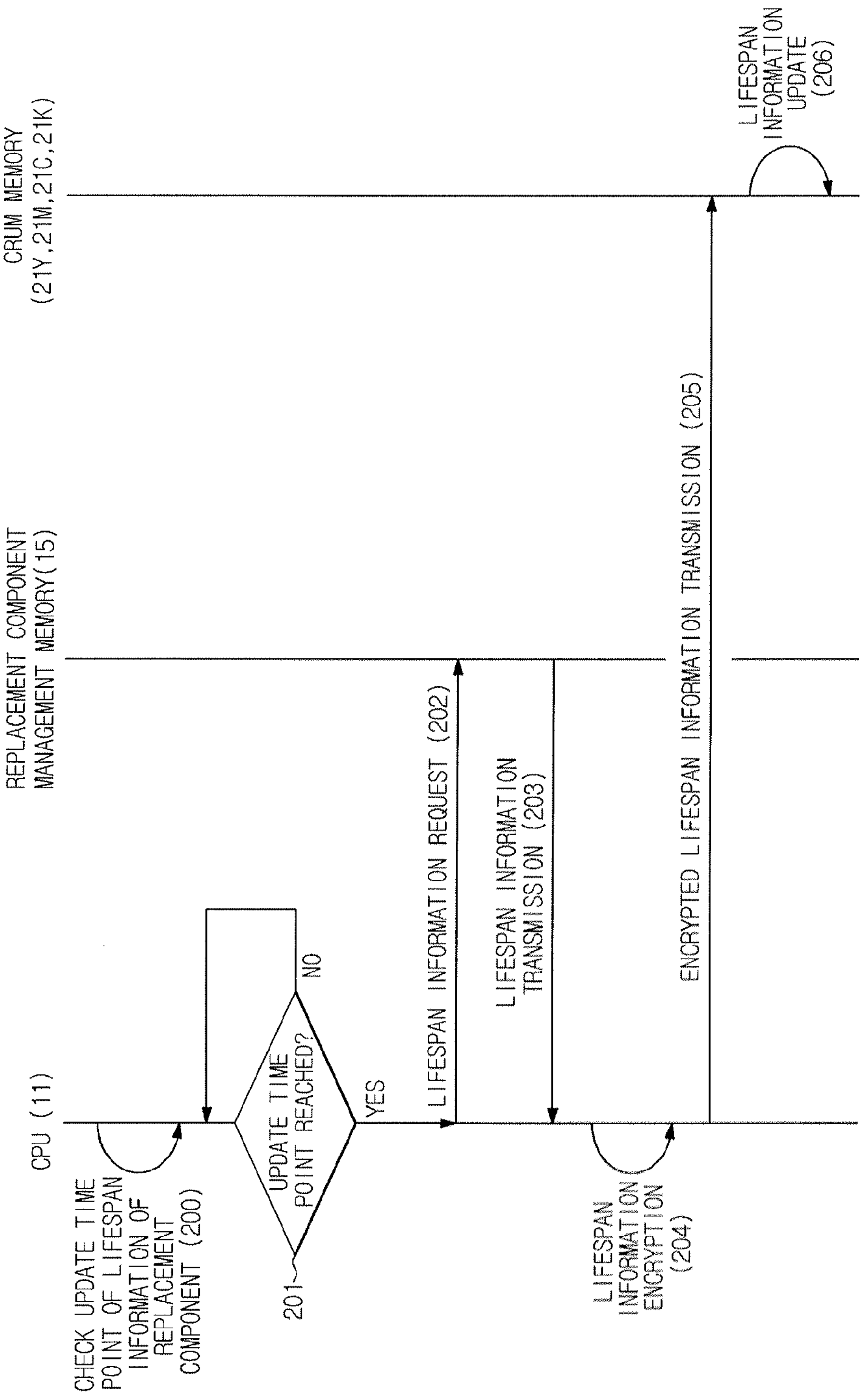
FIG. 8 is a control flowchart illustrating signal flow of a main controller unit and a development unit in the image forming apparatus shown in FIG. 7.

FIG. 7 is a schematic control block diagram of an image forming apparatus according to another embodiment of the present general inventive concept, and FIG. 8 is a control flowchart showing signal flow of a main controller unit and a development unit in the image forming apparatus shown in FIG. 7.

As shown in FIG. 7, the image forming apparatus according to an exemplary embodiment of the present general inventive concept includes a main controller unit 10 including a CPU 11 and a replacement component management memory 15, and a development unit 20 including CRUM memories 21Y, 21M, 21C and 21K respectively provided in four toner cartridges of yellow (Y), magenta (M), cyan (C) and black (K).

The CPU 11 may encrypt and store the lifespan information of the development unit 20 in the replacement component management memory 15 whenever the development unit 20 is used.

In this state, the CPU 11 encrypts and transmits the lifespan information stored in the replacement component management memory 15 to the CRUM memories 21Y, 21M, 21C and 21K of the development unit 20 so as to update the lifespan information of the CRUM memories 21Y, 21M, 21C and 21K of the development unit 20 such that the lifespan information of the replacement component management memory 15 coincides with the lifespan information of the CRUM memories 21Y, 21M, 21C and 21K.

As shown in FIG. 8, the CPU 11 checks a time point when the lifespan information of the CRUM memories 21Y, 21M, 21C and 21K of the development unit 20 is updated using the lifespan information of the development unit 20, which is stored in the replacement component management memory 15 (200). The lifespan information may be updated periodically and/or based on a condition including, but not limited to, after the toner is developed on the photosensitive drum, after the developed toner image is transferred onto the transfer belt, after the image is transferred onto the sheet and before the image is fixed, before the fixing process is completed, and/or after the fixing process is completed and the sheet is ejected. Additionally, the lifespan information may be updated when 50% or 70% of the printing operation is performed and/or when a post-processing operation is performed after the printing operation is completed. The update operation may also be randomly performed.

After the time point when the lifespan information is updated is checked, the CPU 11 determines whether a time point has been reached (201) when the lifespan information of the CRUM memories 21Y, 21M, 21C and 21K of the development unit 20 is updated using the lifespan information of the development unit stored in the replacement component management memory 15.

If it is determined that the update time point of the lifespan information is reached, the CPU 11 requests transmission of the lifespan information of the development unit 20 to the replacement component management memory 15 (202).

The replacement component management memory 15, which receives the request corresponding to the transmission of the lifespan information from the CPU 11, transmits the lifespan information of the development unit 20 stored therein to the CPU 11 according to the request to request to transmit the lifespan information (203).

Then, the CPU 11 encrypts the lifespan information of the development unit 20 (204) and transmits the encrypted lifespan information of the development unit 20 to the CRUM memories 21Y, 21M, 21C and 21K (205).

The CRUM memories 21Y, 21M, 21C and 21K of the development unit 20, which receive the encrypted lifespan information of the development unit 20, update the lifespan information of the development unit 20 stored therein using the received encrypted lifespan information.

Figure 9:
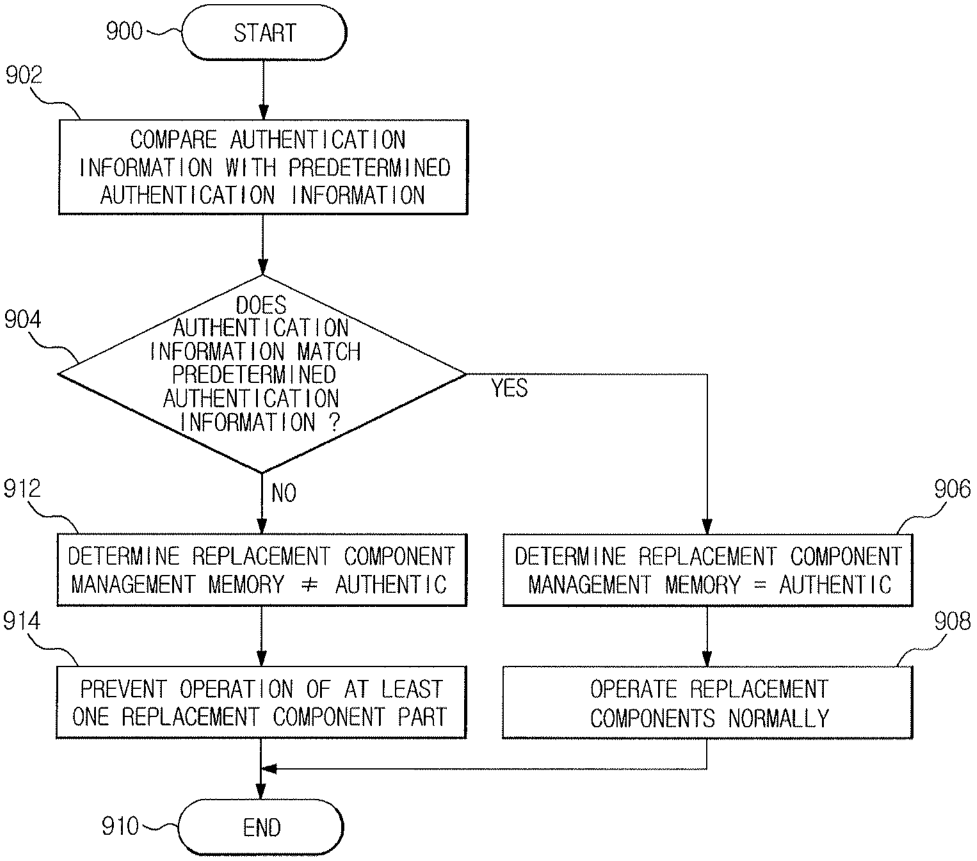
FIG. 9 illustrates a flow diagram showing a method of controlling an image forming apparatus according to the present general inventive concept.

Referring now to FIG. 9, a flow diagram is illustrated showing a method of controlling an image forming apparatus according to the present general inventive concept. The method begins at operation 900, and proceeds to operation 902 to compare authentication information with predetermined authentication information. In operation 904, the authentication information, such as an authentication key, is determined whether to match the predetermined authentication information. If the authentication information matches the predetermined authentication information, the replacement component management memory 15 is determined to be authentic in operation 906. Accordingly, the method proceeds to operation 908 where the replacement components 22 are operated normally, i.e., an image may be formed via the replacement components, and the method ends at operation 910. However, if the authentication information does not match the predetermined authentication information in operation 904, the method proceeds to operation 912 and the replacement component management memory 15 is determined to be unauthentic. Accordingly, the method proceeds to operation 914 where at least one replacement component 22 is prevented from being operated, i.e., an image is prevented from properly being generated, and the method ends at operation 910.

Although a few exemplary embodiments of the present general inventive concept have been shown and described, it would be appreciated by those skilled in the art that changes may be made in these exemplary embodiments without departing from the principles and spirit of the general inventive concept, the scope of which is defined in the claims and their equivalents.

What is claimed is:

1. An image forming apparatus comprising:

a replacement component; and a main controller unit including a replacement component management memory having information for authentication of the replacement component management memory stored therein and a Central Processing Unit (CPU) to read one or more information for authentication stored in the replacement component management memory, to perform an authentication operation of the replacement component management memory and to switch a mode of the replacement component management memory from a current mode to a normal mode based on a result of an authentication operation of the replacement component management memory, wherein the main controller unit determines whether the information for authentication corresponds to predetermined information for authentication of the main controller unit, wherein the replacement component management memory is installed in only the main controller unit, and wherein the CPU encrypts and stores lifespan information in a Customer Replaceable Unit Monitoring (CRUM) memory after the authentication operation of the replacement component management memory is completed.

2. The image forming apparatus according to claim 1, wherein the replacement component management memory stores a replacement component apparatus authentication key, and the CPU checks whether the replacement component management memory is genuine depending on whether the replacement component apparatus authentication key stored in the replacement component management memory coincides with a predetermined apparatus authentication key of the main controller unit and performs the authentication with respect to the replacement component management memory.

3. The image forming apparatus according to claim 2, wherein the replacement component management memory has lifespan information of the replacement component stored therein.

4. The image forming apparatus according to claim 3, wherein the replacement component is a development unit and the lifespan information of the development unit includes at least one of information about the amount of toner in the development unit, information about the amount of the toner consumed from the development unit, information about a driving time of the development unit and print output page count information.

5. The image forming apparatus according to claim 1, wherein the replacement component management memory is integrally formed with the CPU.

6. The image forming apparatus according to claim 1, further comprising a flash memory, wherein the replacement component management memory is integrally formed with the flash memory.

7. The image forming apparatus according to claim 1, wherein the replacement component management memory is detachably connected to the main controller unit by a sub printed circuit board on which the replacement component management memory is mounted.

8. The image forming apparatus according to claim 1, wherein information for authentication includes a replacement component apparatus authentication key and ID information.

* * * * *